(12) United States Patent
Shibata et al.

(10) Patent No.: US 6,801,644 B1
(45) Date of Patent: Oct. 5, 2004

(54) METHOD AND APPARATUS FOR SELECTIVELY DISPLAYING MEASUREMENT RESULT AND CORRESPONDING IMAGES

(75) Inventors: Hiromi Shibata, Kaisei-machi (JP); Nobuhiko Ogura, Kaisei-machi (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/537,749

(22) Filed: Mar. 30, 2000

(30) Foreign Application Priority Data

Mar. 30, 1999 (JP) .......................................... 11-089355

(51) Int. Cl.[7] ................................................ G06K 9/00
(52) U.S. Cl. ........................ 382/129; 702/19; 345/780
(58) Field of Search ................................ 382/128, 129; 702/19, 20, 21; 345/780, 781, 783

(56) References Cited

U.S. PATENT DOCUMENTS

| | | | | |
|---|---|---|---|---|
| 4,749,990 A | * | 6/1988 | Birkner ....................... 345/537 |
| 5,682,441 A | | 10/1997 | Ligtenberg et al. | |
| 5,970,500 A | * | 10/1999 | Sabatini et al. .......... 707/104.1 |
| 6,420,108 B2 | * | 7/2002 | Mack et al. .................... 435/6 |
| 6,453,241 B1 | * | 9/2002 | Bassett. et al. ............... 702/19 |
| 6,453,245 B1 | * | 9/2002 | Rothberg et al. ............. 702/20 |
| 6,532,462 B2 | * | 3/2003 | Balaban ......................... 707/4 |
| 6,577,956 B1 | * | 6/2003 | Shams ......................... 702/19 |

OTHER PUBLICATIONS

Marshall A et al.: "DNA Chips: An Array of Possibilitites", Nature Biotechnology, Nature Publishing, US, vol. 16, 1998, pp. 27–31, XP000198576, ISSN: 1087–0156, p. 27–p. 31.

* cited by examiner

Primary Examiner—Samir Ahmed
Assistant Examiner—Anand Bhatnagar
(74) Attorney, Agent, or Firm—Sughrue Mion, PLLC

(57) ABSTRACT

An image display apparatus contains a display unit which displays information. A table displaying unit controls the display unit so as to display a measurement result table including a plurality of lists each of which is obtained from at least two corresponding measurement spots in at least two images, where the at least two corresponding measurement spots belong to the at least two images, respectively, so that the at least two images each include a plurality of measurement spots which respectively correspond to a plurality of measurement spots in every other one of the at least two images. An instruction receiving unit receives an instruction to select one of the plurality of lists in the measurement result table. An image display control unit controls the display unit so as to selectively display a portion of each of the at least two images so that the portion contains one of the plurality of measurement spots which corresponds to the one of the plurality of lists.

28 Claims, 11 Drawing Sheets

FIG.7

| No. | Field | X | Y | Pattern | Ratio | Judge |
|-----|-------|---|----|---------|-------|-------|
| 1 | 3 | b | 12 | 14 | 10.2 | |
| 2 | 5 | c | 4 | 8 | 8.5 | |
| 3 | 2 | n | 13 | 2 | 5.3 | |
| 4 | 1 | a | 15 | 14 | 4.9 | |
| 5 | 1 | o | 1 | 38 | 4.8 | |
| 6 | 2 | f | 4 | 44 | 3.8 | |
| 7 | 6 | g | 7 | 26 | 3.6 | |

FIG.9

| No. | Field | X | Y | Pattern | Ratio | Judge |
|---|---|---|---|---|---|---|
| 1 | 3 | b | 12 | 14 | 10.2 | |
| 2 | 5 | c | 4 | 8 | 8.5 | |
| 3 | 2 | n | 13 | 2 | 5.3 | |
| 4 | 1 | a | 15 | 14 | 4.9 | |
| 5 | 1 | o | 1 | 38 | 4.8 | |
| 6 | 2 | f | 4 | 44 | 3.8 | |
| 7 | 6 | g | 7 | 26 | 3.6 | |

METHOD AND APPARATUS FOR SELECTIVELY DISPLAYING MEASUREMENT RESULT AND CORRESPONDING IMAGES

BACKGROUND OF THE INVENTION

1. Field of the Invention

The present invention relates to an image display method and an image display apparatus for displaying, using a display unit such as a CRT, at least one image and a table which indicates results of measurement performed in the image in the form of a plurality of lists. For example, the image is obtained by detecting a material of biological origin on an array chip which is provided for DNA analysis, immunological analysis, or the like.

2. Description of the Related Art

Recent development in gene engineering technology has been remarkable. Such development in the gene engineering technology is enabling, for example, the human genome project which is attempting to unravel all of the base sequences of the human genome, although the total number of genes in the human genome are considered to be in the order of hundreds of thousands. In addition, in order to clarify causes of various genetic diseases, research on DNA is progressing rapidly.

On the other hand, various techniques utilizing antigen-antibody reactions, such as the fluorescent antibody method, enzyme immunoassay, and the like, are used for diagnosis and study.

In particular, one of the techniques which is used in research on DNA and is currently receiving attention is the so-called array technology.

In the array technology, an array chip 1 as illustrated in FIG. 1 is used. The array chip 1 is produced by two-dimensionally and densely arraying a great number of different, specific binding materials on a support 2. The specific binding materials are known materials, and are for example, complementary DNAs, i.e., cDNAs. The support 2 is, for example, a membrane filter, a slide glass, or the like. The DNA chip is a typical example of the array chip.

For example, the array (DNA) chips are used as follows.

A first cDNA derived from cells of healthy person is labeled with a labeling material such as a fluorescent dye, a radioactive isotope, or the like. In addition, a second cDNA derived from cells of a genetically diseased person is labeled with the labeling material. On the other hand, first and second array chips are provided, where the same sets of a plurality of different cDNAs are arrayed on the first and second array chips. Then, the first and second labeled sample cDNAs are respectively placed on the first and second array chips so that the first and second cDNAs hybridize with those on the first and second array chips, respectively. Thereafter, each of the first and second array chips are scanned by laser light to excite the labeling material, and fluorescent light or radiation emitted from the respective cDNAs is detected by a photodetector to obtain a label signal which represents detection results corresponding to respective emission positions (spot positions) on each of the first and second array chips. Based on the label signals obtained from the first and second array chips, it is possible to determine which of the first and second cDNAs hybridizes with each cDNA. Then, the amount of the first cDNA which hybridizes with each cDNA on an array chip, and the amount of the second cDNA which hybridizes with each cDNA on another array chip are compared by obtaining a difference or a ratio between the label signals obtained from the respective array chips. Based on the comparison results, it is possible to identify a varied cDNA (a cDNA increased or lost which may be related to a genetic disease). Such a cDNA can be found by viewing two images represented by the above label signals, as printed images or displayed images.

In addition, the above ratio increases with the degree of gene expression. Therefore, if, for example, the fifty greatest ratios are output in decreasing order, with the corresponding spot positions, in the form of a table of measurement results, it is possible to see which genes are expressed most by obtaining the spot position based on the table of measurement results, and it seems to be possible to confirm that the gene is likely to be expressed in the images displayed based on the label signals.

However, in practice, the number of the spots on an array chip is at least five hundred, and some array chips have tens of thousands of spots. Therefore, it is very difficult to find a spot position corresponding to a measurement result, by a visual search of the displayed images.

SUMMARY OF THE INVENTION

The object of the present invention is to provide an image display method and an image display apparatus whereby an operator can easily recognize a local image of a measurement spot corresponding to a measurement result.

In order to accomplish the above-mentioned object, according to the first aspect of the present invention, there is provided an image display method including the steps of (a) displaying a measurement result table including a plurality of lists each of which is obtained from at least two corresponding measurement spots in at least two images, where the at least two corresponding measurement spots belong to the at least two images, respectively, so that the at least two images each include a plurality of measurement spots which respectively correspond to a plurality of measurement spots in every other one of the at least two images; (b) receiving an instruction to select one of the plurality of lists in the measurement result table; and (c) selectively displaying a portion of each of the at least two images so that the portion contains one of the plurality of measurement spots which corresponds to the one of the plurality of lists.

That is, each measurement result is obtained from a set of corresponding measurement spots in the at least two images, and each list is produced corresponding to a set of corresponding measurement spots in the at least two images. The above measurement result table can be formed by arranging the above plurality of lists in rows in a predetermined order.

The image may be in a form of he obtained image itself or a pseudo color image which is represented by difference in density of color changed in the measurement spots according to the measurement result or represented by difference in general density of color between different images.

According to the image display method of the first aspect of the present invention, the operator can select, in step (b), a desired list from the measurement result table displayed in step (a). In response to the selection, the portions containing the measurement spots in the at least two images corresponding to the selected list are automatically displayed in step (c). Therefore, the operator can efficiently confirm the measurement results referring to the images (the above portions) of the corresponding measurement spots.

In addition, it is possible to display the images (the above described portions) of the corresponding measurement spots and the measurement result table at the same time in a display screen. In this case, the image display method facilitates the operator's confirmation more effectively.

In step (c) of the above image display method according to the first aspect of the present invention, the above described portions may include only the image of the measurement spot corresponding to the list which is selected in accordance with the instruction received in step (b). Alternatively, the above described portions may include a peripheral image around the measurement spot, in addition to the image of the measurement spot per se. Since the corresponding measurement spot exists in each of the above-mentioned at least two images, the images of all of the corresponding measurement spots are displayed at the same time in step (c).

The above image display method according to the first aspect of the present invention may further comprise the following additional features.

(1) In the above image display method according to the first aspect of the present invention, in step (c), a mark indicating the measurement spot corresponding to the list which is selected in accordance with the received instruction or a mark indicating the selected list may be displayed in the above described portions of each of the at least two images.

The above mark may be displayed in any manner as long as the mark facilitates discrimination of the image of the desired measurement spot from the other images. For example, the effect of the indication of a mark may be achieved by displaying an arrow which indicates the desired measurement spot or the selected list, or by changing a color of the image of the measurement spot or the selected list, or flashing or inverting the image of the measurement spot or the selected list.

By the above indication of a mark, the operator can refer to the images corresponding to the measurement result more easily.

(2) The above image display method according to the first aspect of the present invention may further include the steps of receiving an input of an evaluation of the measurement result corresponding to the selected list, and displaying the evaluation in the measurement result table.

The above evaluation is made by an operator based on the measurement result displayed in the measurement result table and the image of the measurement spot.

According to the additional feature (2), the operator can refer to the evaluations of the measurement results later without repeatedly observing the corresponding images.

(3) The above image display method comprising the additional feature (2) may further include the steps of automatically selecting another list in the measurement result table in response to the input of the evaluation or a predetermined operation which is performed after the input of the evaluation, and displaying another portion of each of the at least two images so that the displayed portion of each of the at least two images contains a measurement spot which corresponds to the automatically selected list.

The above predetermined operation may be performed for fixing the input of the evaluation. For example, when a keyboard is used for the input, the predetermined operation may be the operation of completing the input of the evaluation per se, or an operation of pressing the return key after the input of the evaluation.

According to the additional feature (3), the operator can confirm a series of measurement results more efficiently.

(4) In the above image display method comprising the additional feature (3), the above automatically selected list may be next to the list selected in accordance with the instruction received in step (b).

For example, when the plurality of lists are arranged in the vertical direction in the measurement result table, the next list is above or under the list currently selected in accordance with the instruction received in step (b).

According to the additional feature (4), the operator can confirm a series of measurement results very efficiently.

(5) In the above image display method according to the first aspect of the present invention, each image may be represented by a label signal emitted from a labeling material with which a material of biological origin is labeled, where the material of biological origin is bound with a plurality of different, known, specific binding materials arranged at a plurality of predetermined positions on one of a plurality of supports, and the material of biological origin labeled with the labeling material which emits the label signal representing each image is different from a material of biological origin labeled with the labeling material which emits another label signal representing every other image. In addition, the measurement result may be a result of comparison of the label signal representing each image, with the label signal representing every other image.

The above plurality of supports mentioned in the additional feature (5) may be made of any material as long as the supports can stably bind thereon the plurality of specific binding materials, and fix the specific binding materials at predetermined spot positions. The plurality of supports may be, for example, membrane filters, slide glasses, or the like. In order to stably bind the specific binding materials, the plurality of supports may undergo appropriate pretreatment. By binding the specific binding materials with the plurality of supports, the plurality of array chips are formed.

Each of the above plurality of different, known, specific binding materials mentioned in the additional feature (5) is a material which can specifically bind with the materials of biological origin. For example, the plurality of specific binding materials may be hormones, tumor markers, emzymes, antibodies, antigens, abzymes, other proteins, nucleic acids, cDNAs, DNAs, RNAs, or the like. When the "known, specific binding materials" are nucleic acids, the word "known" means that the base sequences and the lengths thereof are known, or when the "known, specific binding materials" are proteins, the word "known" means that the compositions of amino acids constituting the proteins are known. In addition, the above plurality of different, known, specific binding materials are arranged at a plurality of predetermined spot positions respectively corresponding to the aforementioned plurality of measurement spots. One specific binding material is deposited at each spot position, and the same specific binding material is fixed to all of the corresponding spot positions of the plurality of supports (corresponding to the aforementioned at least two corresponding measurement spots of the at least two images).

The material of biological origin mentioned in the additional feature (5) is a material which can specifically bind with the above plurality of different, known, specific binding materials arranged at the plurality of predetermined positions on the plurality of supports. In the present invention, the material of biological origin is not limited to materials which are directly extracted and isolated from organisms, and includes materials which are chemically processed or chemically modified after being extracted from organisms. The material of biological origin may be, for example, hormones, tumor markers, emzymes, antibodies, antigens, abzymes, other proteins, nucleic acids, cDNAs, DNAs, mRNAs, or the like.

The labeling material mentioned in the additional feature (5) may be a marker material which is directly attached to the above-mentioned material of biological origin. Alternatively, the material of biological origin per se may be modified for the purpose of labeling. The labeling material may be any material as long as the label signal emitted from the labeling material can be detected, and the labeling material is attached to the material of biological origin in a certain manner, or the material of biological origin is modified in a certain manner. It is preferable to use as the labeling material a fluorescent dye such as SYBR®Green II, Cy5™, and fluorescein isothiocyanate, or a radioactive isotope such as $^{32}$P and $^{33}$P.

The label signal mentioned in the additional feature (5) is a signal which is emitted or output from the labeling material which is attached to the above material of biological origin, and can be detected by a detector. For example, the label signal is a fluorescent light (when the labeling material is a fluorescent material), or radiation (when the labeling material is a radioactive isotope).

In the additional feature (5), the binding between the material of biological origin and the plurality of different, known, specific binding materials may be hybridization, i.e., formation of a stable double strand of complementary nucleotide sequences, which is formed, for example, in DNAs and RNAs. Alternatively, the above binding may be extremely specific binding which selectively occurs only between specific materials, such as binding between an antibody and an antigen, or between biotin and avidin. The same material of biological origin is bound with a specific binding material at the corresponding spot positions of the plurality of array chips.

The result of the comparison mentioned in the additional feature (5) may be a ratio or a difference between the label signals obtained from the corresponding spot positions of two array chips among the plurality of array chips. That is, the ratio or the difference is the aforementioned measurement result obtained from the corresponding measurement spots of the at least two images. To be more specific, a template indicating the spot positions of the specific binding materials is used for determining the positions of the label signals emitted from the array chips, and ratios or differences between values of the label signals at corresponding positions in the array chips are obtained as the results of comparison. Then, the results of comparison are listed in decreasing order, together with the positions from which the corresponding label signals are obtained, to form and output a measurement result table.

According to the second aspect of the present invention, there is provided an image display method including the steps of (a) displaying a measurement result table including a plurality of lists each of which is obtained from at least two corresponding measurement spots in at least two images, where the at least two corresponding measurement spots belong to the at least two images, respectively, so that the at least two images each include a plurality of measurement spots which respectively correspond to a plurality of measurement spots in every other one of the at least two images; (b) receiving an instruction to select one of the plurality of measurement spots where the desired measurement result is obtained in one of the at least two images; and (c) selectively displaying a list showing the measurement result corresponding to the selected measurement spot in the measurement result table.

In the above image display method according to the second aspect of the present invention, in step (c), a mark indicating the measurement spot corresponding to the list which is selected in accordance with the received instruction or a mark indicating the list showing the corresponding measurement result may be displayed in the above described portions of each of the at least two images.

The above image display method according to the second aspect of the present invention may further include the steps of receiving an input of an evaluation of the selected measurement spot, and displaying the evaluation in the measurement result table.

In the above image display method according to the second aspect of the present invention, each image may be represented by a label signal emitted from a labeling material with which a material of biological origin is labeled, where the material of biological origin is bound with a plurality of different, known, specific binding materials arranged at a plurality of predetermined positions on one of a plurality of supports, and the material of biological origin labeled with the labeling material which emits the label signal representing each image is different from a material of biological origin labeled with the labeling material which emits another label signal representing every other image. In addition, the measurement result may be a result of comparison of the label signal representing each image, with the label signal representing every other image.

In order to accomplish the aforementioned object, according to the first aspect of the present invention, there is provided an image display apparatus containing a display unit, a table displaying control unit, an instruction receiving unit, and an image display control unit. The display unit displays information. The table displaying unit controls the display unit so as to display a measurement result table including a plurality of lists respectively containing a plurality of measurement results each of which is obtained from at least two corresponding measurement spots in at least two images, where the at least two corresponding measurement spots belong to the at least two images, respectively, so that the at least two images each include a plurality of measurement spots which respectively correspond to a plurality of measurement spots in every other one of the at least two images. The instruction receiving unit receives an instruction to select one of the plurality of lists in the measurement result table. The image display control unit controls the display unit so as to selectively display a portion of each of the at least two images so that the portion contains one of the plurality of measurement spots which corresponds to the one of the plurality of lists.

The above image display apparatus according to the first aspect of the present invention may further comprise the following additional features.

(1') In the above image display apparatus according to the first aspect of the present invention, the image display control unit may control the display unit so as to further display, in the above portion of each image, a mark indicating the measurement spot corresponding to the list which is selected in accordance with the received instruction.

(2') The above image display apparatus according to the first aspect of the present invention may further include an evaluation displaying unit which receives an input of an evaluation of the measurement result corresponds to the selected list, and displays the evaluation in the measurement result table.

(3') The above image display apparatus comprising the additional feature (2') may further include an automatic selection unit which automatically selects another list in the measurement result table in response to the input of the evaluation or a predetermined operation which is performed after the input of the evaluation, and controls the display unit so as to selectively display another portion of each image so that the displayed portion of each image contains a measurement spot which corresponds to the automatically selected list.

(4') In the above image display apparatus comprising the additional feature (3'), the above automatically selected list may be next to the list selected in accordance with the instruction received by the instruction receiving unit.

(5') In the above image display apparatus according to the first aspect of the present invention, each image may be represented by a label signal emitted from a labeling material with which a material of biological origin is labeled, where the material of biological origin is bound with a plurality of different, known, specific binding materials arranged at a plurality of predetermined positions on one of a plurality of supports, and the material of biological origin labeled with the labeling material which emits the label signal representing each image is different from a material of biological origin labeled with the labeling material which emits another label signal representing every other image. In addition, the measurement result may be a result of comparison of the label signal representing each image, with the label signal representing every other image.

In order to accomplish the aforementioned object, according to the second aspect of the present invention, there is provided an image display apparatus containing a display unit, a table displaying control unit, an instruction receiving unit, and an image display control unit. The display unit displays information. The table displaying unit controls the display unit so as to display a measurement result table including a plurality of lists respectively containing a plurality of measurement results each of which is obtained from at least two corresponding measurement spots in at least two images, where the at least two corresponding measurement spots belong to the at least two images, respectively, so that the at least two images each include a plurality of measurement spots which respectively correspond to a plurality of measurement spots in every other one of the at least two images. The instruction receiving unit receives an instruction to select one of the plurality of measurement spots where the desired measured result is obtained in one of the at least two images. The image display control unit controls the display unit so as to selectively display the lists showing the measurement result corresponding to the selected measurement spot in the measurement result table. In the above image display apparatus according to the second aspect of the present invention, in step (c), a mark indicating the measurement spot corresponding to the list which is selected in accordance with the received instruction or a mark indicating the list showing the corresponding measurement result may be displayed in the above described portions of each of the at least two images.

The above image display apparatus according to the second aspect of the present invention may further include the steps of receiving an input of an evaluation of the selected measurement spot, and displaying the evaluation in the measurement result table.

In the above image display apparatus according to the second aspect of the present invention, each image may be represented by a label signal emitted from a labeling material with which a material of biological origin is labeled, where the material of biological origin is bound with a plurality of different, known, specific binding materials arranged at a plurality of predetermined positions on one of a plurality of supports, and the material of biological origin labeled with the labeling material which emits the label signal representing each image is different from a material of biological origin labeled with the labeling material which emits another label signal representing every other image. In addition, the measurement result may be a result of comparison of the label signal representing each image, with the label signal representing every other image.

According to the image display method and apparatus of the second aspect of the present invention, the operator can select, in step (b), one of the plurality of measurement spots where the desired measured result is obtained in one of the at least two images. In response to the selection, lists showing the measurement result corresponding to the selected measurement spot in the measurement result table are automatically displayed in step (c). Therefore, the operator can efficiently confirm the measurement results referring to the images (the above portions) of the corresponding measurement spots.

DESCRIPTION OF THE DRAWINGS

FIG. 7 shows an example of the display of the measurement result table H on the monitor 15.

FIG. 9 shows an example of a measurement result table and images which are displayed on the monitor 15 when the number of the samples is four.

DESCRIPTION OF PREFERRED EMBODIMENTS

Embodiments of the present invention are explained in detail below with reference to drawings.

(1) Array Chip

Figure 1:
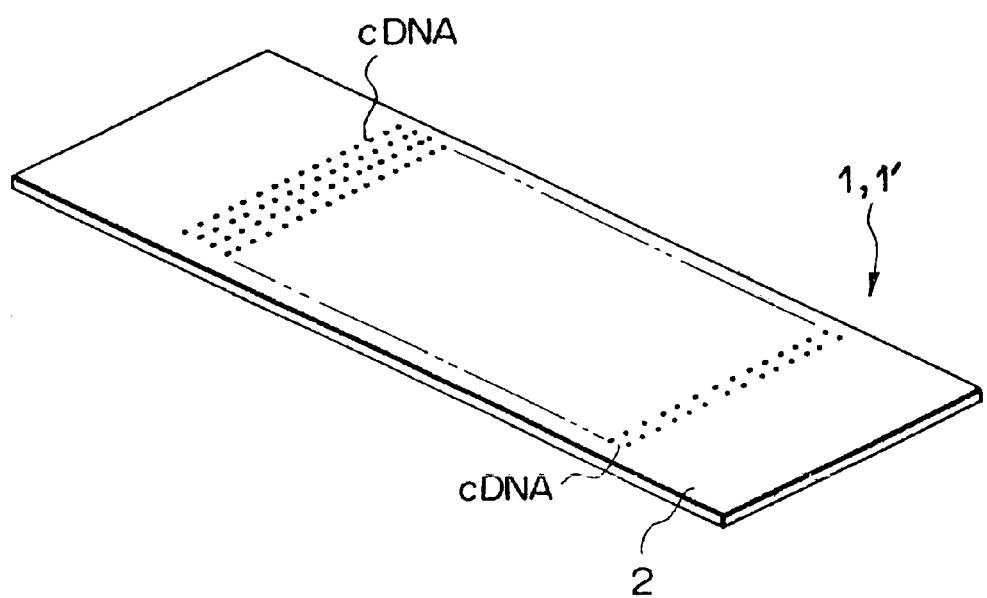
FIG. 1 is a diagram illustrating an array chip used in an embodiment of the present invention.

FIG. 1 is a diagram illustrating an array chip used in an embodiment of the present invention. The array chip 1 or 1' illustrated in FIG. 1 is formed by arranging a plurality of different, known cDNAs (as specific binding materials) at a plurality of predetermined positions on a support 2, which is, for example, a membrane filter, a slide glass, or the like. The plurality of cDNAs correspond to a plurality of different DNAs of which base sequences are already decoded, and the spot positions of the respective cDNAs on the support 2 are predetermined by the manufacturer of each array chip. Two array chips 1 and 1' each having the construction of FIG. 1 are provided, and are respectively hybridized with two different cDNAs (as a material derived from biological origin). The two different cDNAs are respectively derived from different samples A and B, and are labeled with a fluorescent dye. In this embodiment, the sample A is a healthy person, and the sample B is a genetically diseased person. That is, the labeled cDNAs of the samples A and B are placed on the cDNAs on the array chips 1 and 1', so that the labeled cDNA of the sample A hybridizes with the cDNAs on the first array chips 1, and the labeled cDNA of the sample B hybridizes with the cDNAs on the second array chips 1'. Then, remaining portions of the cDNAs other than those hybridize with the cDNAs on the array chips 1 and 1' are washed out with a predetermined solution. Thereafter, the first and second array chips 1 and 1' are examined as described below.

(2) Construction of Array Reader

Figure 2:
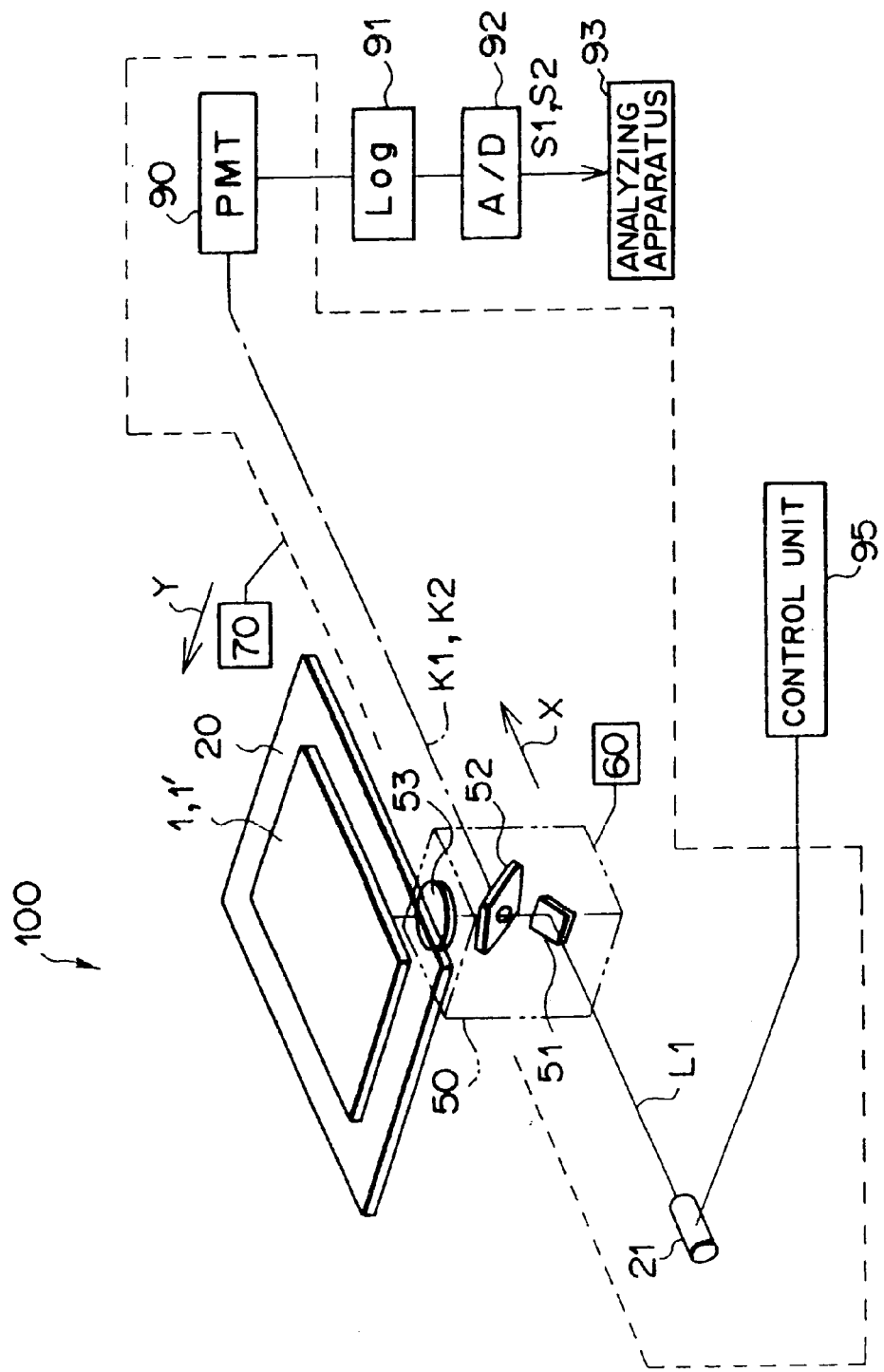
FIG. 2 is a diagram illustrating the construction of an array reader as the embodiment of the present invention.

FIG. 2 is a diagram illustrating the construction of an array reader as the embodiment of the present invention. The array reader 100 illustrated in FIG. 2 comprises a transparent stage 20, a laser light source 21, a photomultiplier (PMT) 90, an optical head 50, a main scanning unit 60, a sub-scanning unit 70, an amplifier 91, an analog-to-digital converter 92, an analyzing apparatus 93, and a control unit 95.

Each array chip 1 to 1' can be mounted on the stage 20, and fixed at a predetermined position on the stage 20. Since only one array chip can be mounted on the stage 20 at a time, the two array chips 1 and 1' which are respectively hybridized with the two different cDNAs (as materials of biological origin) are examined by the array reader of FIG. 2 one by one.

The laser light source 21 emits laser light L1 having a wavelength which is suitable for exciting the fluorescent dye. For example, the laser light source 21 may be a He—Ne laser which emits laser light having a wavelength of 633 nm, an SHG laser which emits laser light having a wavelength of 532 nm, or an SHG laser which emits laser light having a wavelength of 473 nm. The laser light having the wavelength of 633 nm is suitable for exciting a fluorescent dye, Cy5™, the laser light having the wavelength of 532 nm is suitable for exciting a fluorescent dye, Cy3™, and the laser light having the wavelength of 473 nm is suitable for exciting a fluorescent dye, fluorescein.

The photomultiplier 90 photoelectrically detects fluorescent light K1 or K2 emitted from the fluorescent dye on each array chip 1 or 1' which is excited by the laser light L1, and outputs a detection signal. The optical head 50 leads the laser light L1 from the laser light source 21 to the array chip 1 or 1' on the stage 20, and also leads the fluorescent light K1 or K2 emitted from the fluorescent dye on each array chip 1 or 1', to the photomultiplier 90. The main scanning unit 60 moves the optical head 50 in the x direction at a constant speed. The sub-scanning unit 70 moves the laser light source 21, the optical head 50, and the photomultiplier 90 as a body in the y direction, which is perpendicular to the x direction. The amplifier 91 logarithmically amplifies the detection signal output by the photomultiplier 90. The analog-to-digital converter 92 performs analog-to-digital conversion on the logarithmically amplified detection signal to obtain label data S1 or S2. The label data S1 and S2 correspond to the array chips 1 and 1', respectively. The analyzing apparatus 93 compares the label data S1 and S2 obtained from corresponding spot positions on the array chips 1 and 1'. The control unit 95 controls emission of the laser light L1 by the laser light source 21. The above label data S1 is comprised of digital values of the logarithmically amplified detection signal obtained from the respective spot positions of the array chip 1, and the above label data S2 is comprised of digital values of the logarithmically amplified detection signal obtained from the respective spot positions of the array chip 1'.

(3) Operations of Array Reader

The operations of the array reader 100 are explained below.

First, the first array chip 1 hybridized with the labeled cDNA of the sample A is mounted on the stage 20, and the control unit 95 controls the laser light source 21 so as to emit the laser light L1. The laser light L1 travels in the x direction, and is incident on plane mirror 51. Then, the laser light L1 is reflected by the plane mirror 51 in the upward direction, passes through an aperture 52a of the apertured mirror 52, and is incident on the lens 53. The lens 53 leads the laser light L1 to a small area of the array chip 1 mounted on the stage 20. Since the optical head 50 is moved in the x direction at a high, constant speed, the laser light L1 scans the array chip 1 in the x direction as the main scanning direction. Therefore, the fluorescent light K1 is emitted from the labeled cDNA which exists in small areas scanned by the laser light L1, due to the excitation of the fluorescent dye by the laser light L1.

The fluorescent light K1 emitted from the fluorescent dye divergently exits from the underside of the array chip 1, is collected by the lens 53, and is then incident on the apertured mirror 52. The fluorescent light K1 is reflected by the reflective surface of the apertured mirror 52, and travels in the x direction to be incident on the photomultiplier 90. Thus, the fluorescent light K1 is photoelectrically detected by the photomultiplier 90, and an electric signal (detection signal) corresponding to the fluorescent light K1 is generated. The electric signal is logarithmically amplified by the amplifier 91, and converted by the analog-to-digital converter 92 into a digital signal.

When the main scanning operation of a line on the array chip 1 is completed as above, the optical head 50 returns to the initial position in the main scanning direction under the control of the main scanning unit 60. While the optical head 50 is moving to the initial position, the sub-scanning unit 70 moves, to the position for scanning the next line, the laser light source 21, the optical head 50, and the photomultiplier 90 as a body in the sub-scanning direction. The above main scanning and the sub-scanning operations are repeated until all of the spot positions on the array chip 1 are scanned. Thus, all of the spot positions on the array chip 1 are sequentially radiated by the laser light L1, and the fluorescent light K1 from all of the spot positions on the array chip 1 are sequentially detected, so that the label data S1 of the sample A is obtained. The label data S1 is supplied to the analyzing apparatus 93.

When the above operation of scanning all of the spot positions on the array chip 1 is completed, the optical head 50 returns to the initial position in both the main scanning and sub-scanning directions, and the second array chip 1' hybridized with the labeled cDNA of the sample A is mounted on the stage 20. Then, the above main scanning and sub-scanning operations are performed in the same manner as above, until all of the spot positions on the array chip 1' are scanned. Thus, the label data S2 of the sample B is obtained, and supplied to the analyzing apparatus 93.

(4) Construction of Analyzing Apparatus

Figure 3:
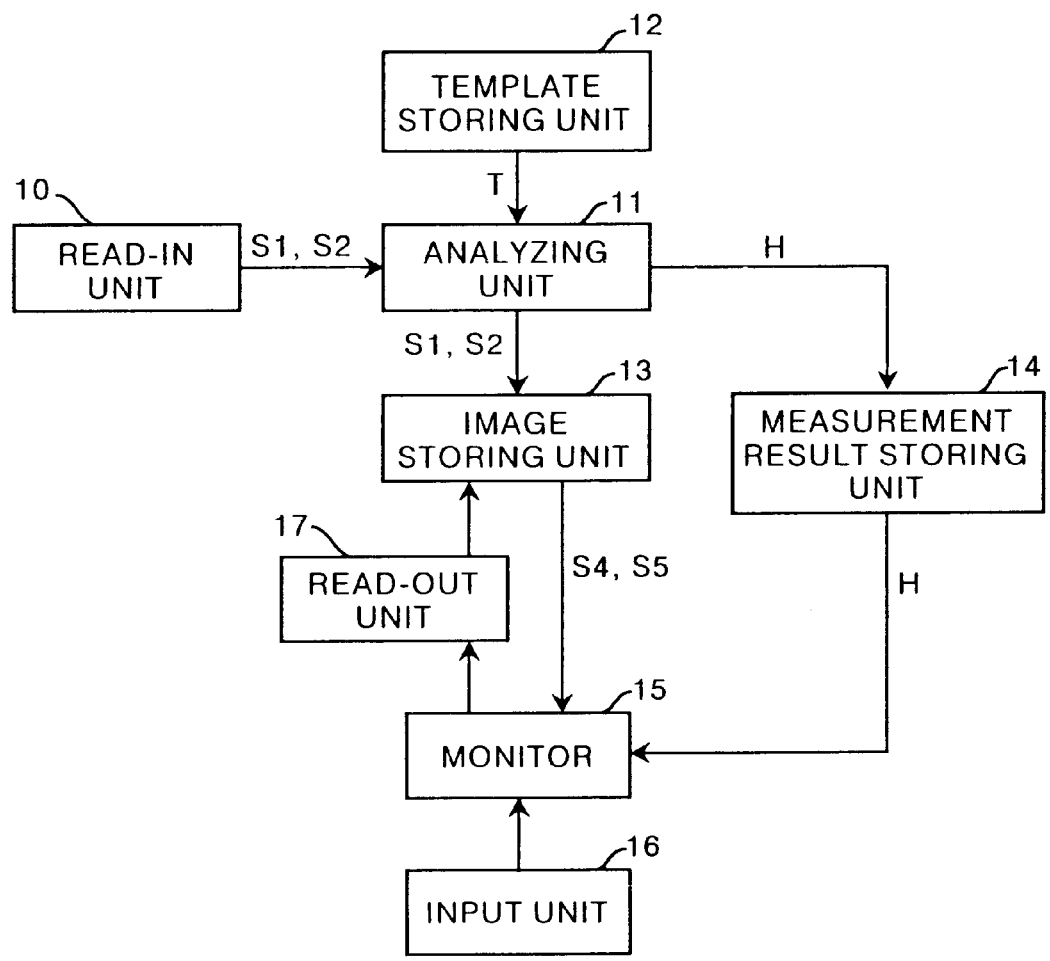
FIG. 3 is a block diagram illustrating the construction of the analyzing apparatus 93.

FIG. 3 is a block diagram illustrating the construction of the analyzing apparatus 93. As illustrated in FIG. 3, the analyzing apparatus 93 comprises a read-in unit 10, an analyzing unit 11, a template storing unit 12, an image storing unit 13, a measurement result storing unit 14, a monitor 15, an input unit 16, and a read-out unit 17.

The read-in unit 10 reads the aforementioned label data S1 and S2. The analyzing unit 11 analyzes the label data S1 and S2, and outputs a measurement result table H. The template storing unit 12 stores a plurality of templates T, which are necessary for the analyzing operation performed by the analyzing unit 11. The image storing unit 13 stores the label data S1 and S2, with which addresses are associated. The associated addresses are determined by using the templates T as explained later. The measurement result storing unit 14 stores the measurement result table H. The monitor 15 displays the measurement result table H and images. The input unit 16 facilitates operations of inputting various information, and comprises a keyboard, a mouse, and the like. The read-out unit 17 reads out, as image data S4 and S5, images at spot positions corresponding to a measurement result which is selected as explained later.

(5) Examples of Templates

Figure 4:
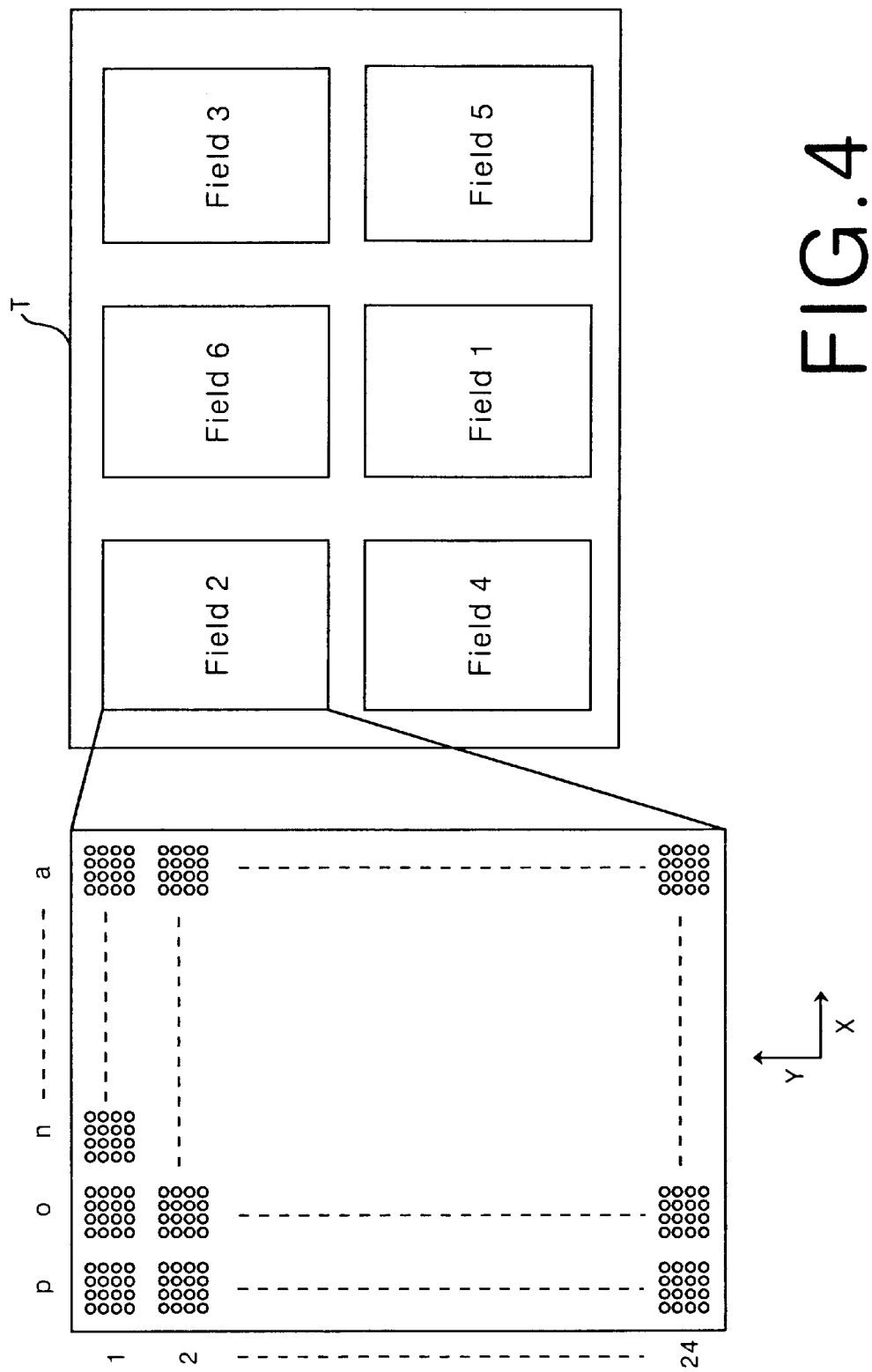
FIG. 4 shows a first example of a template used in the embodiment of the present invention.
Figure 5:
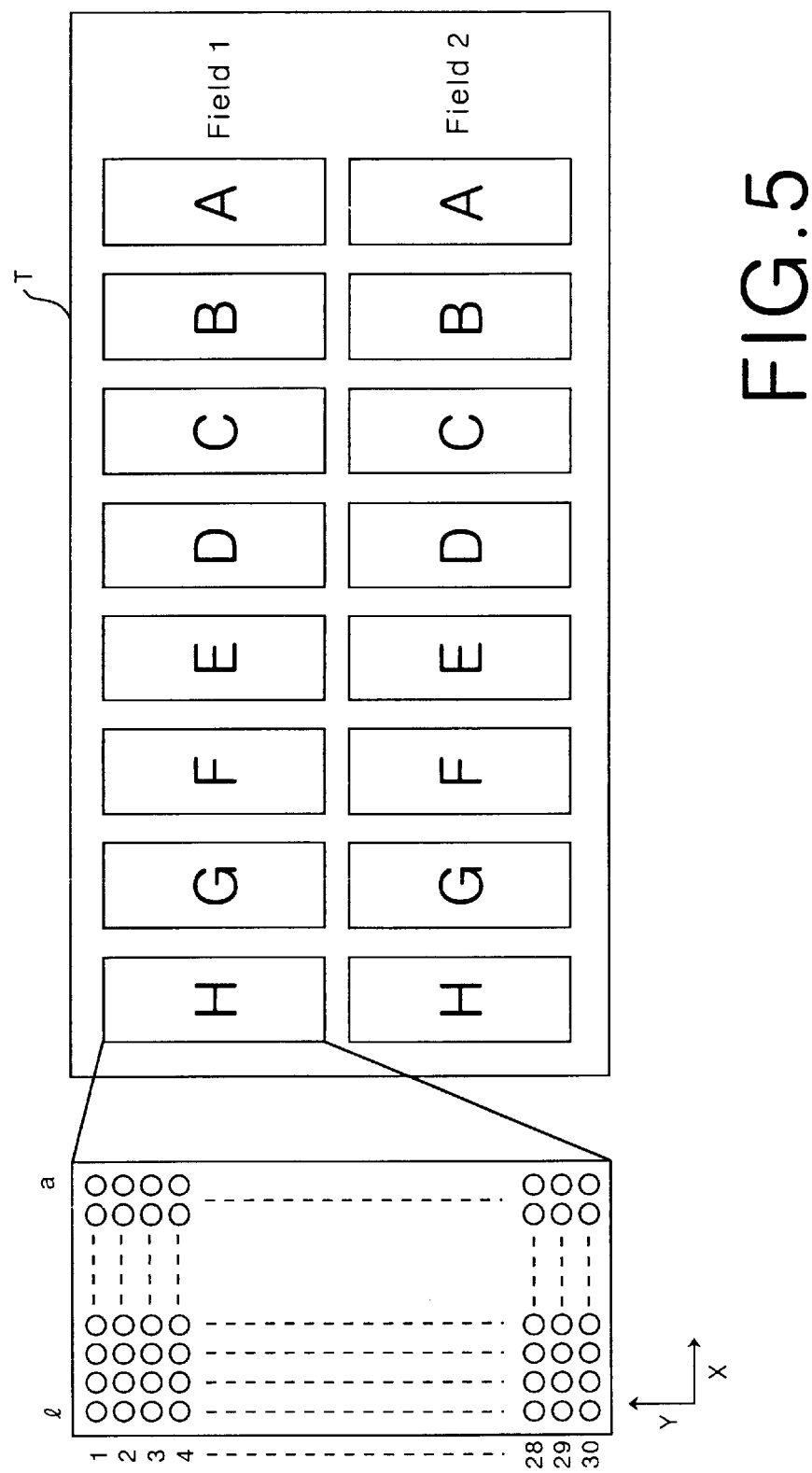
FIG. 5 shows a second example of a template used in the embodiment of the present invention.
Figure 6:
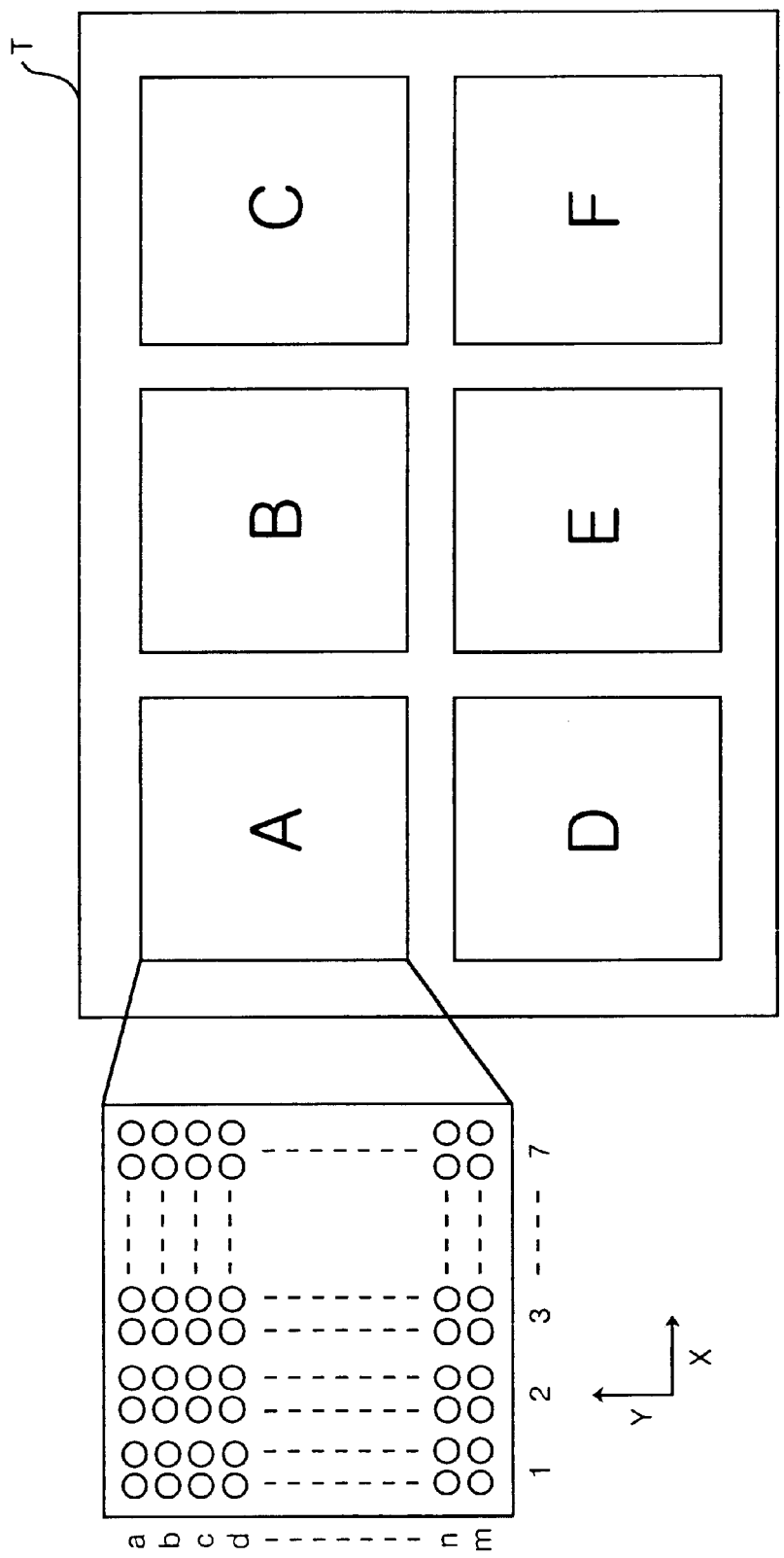
FIG. 6 shows a third example of a template used in the embodiment of the present invention.

The plurality of templates T stored in the template storing unit 12 each include a plurality of regions of interest (ROIs) each having a round shape and corresponding to one of the spot positions of the array chips 1 and 1'. Since various array chip manufacturers supply different types of array chips having different layout of the spot positions on the array chips, the plurality of templates T, for example, as illustrated in FIGS. 4 to 6, are stored in the template storing unit 12, corresponding to the types of array chips which may be used. In FIGS. 4 to 6, the small blank circles correspond to the above-mentioned regions of interest having the round shape.

An address is assigned to each of the above plurality of regions of interest. FIG. 4 shows a first example of a template used in the embodiment of the present invention. In the template of FIG. 4, the entire area of the template of FIG. 4 is divided into six fields "Field 1" to "Field 6". Each field contains 16×24 region-of-interest blocks (ROI blocks), and each ROI block contains 4×4 regions of interest. Address numbers are assigned to the ROI blocks corresponding to the positions of the ROI blocks in each field. Each address number is comprised of an x-direction address number and a y-direction address number. The numbers "a" to "p" are assigned as the x-direction address numbers to the respective ROI blocks, and the numbers "1" to "24" are assigned as the y-direction address numbers to the respective ROI blocks. Thus, the address of the position of each ROI block is expressed, for example, as "a-1". In addition, each ROI block includes spots of eight different cDNAs, and eight pairs of spots are provided for the eight different cDNAs, respectively. Therefore, an identical pattern number is assigned to each pair of spot positions in which the same cDNA is spotted. For example, when a pattern number of a region of interest in the ROI block "a-1" in the field "Field1" is "2", the address of the region of interest can be expressed as "Field1, a-1, 2".

FIG. 5 shows a second example of a template used in the embodiment of the present invention. The template of FIG. 5 is divided into two fields "Field1" and "Field2", and each field is divided into eight areas "A" to "H". Each of the areas "A" to "H" contains 12×30 regions of interest. Address numbers are assigned to the regions of interest corresponding to the positions of the regions of interest in each area. Each address number is comprised of an x-direction address number and a y-direction address number. The numbers "a" to "1" are assigned as the x-direction address numbers to the respective regions of interest, and the numbers "1" to "30" are assigned as the y-direction address numbers to the respective regions of interest. Thus, for example, a region of interest can be expressed as "Field1, B, a-1".

FIG. 6 shows a third example of a template used in the embodiment of the present invention. The template of FIG. 6 is divided into six areas "A" to "F". Each of the areas "A" to "F" contains 7 ROI blocks, and each ROI block contains 14 pairs of regions of interest, i.e., 2×14 regions of interest. In each area, address numbers "1" to "7" are assigned to the seven ROI blocks, and address numbers "a" to "m" are assigned to the respective pairs of regions of interest. An identical address number is assigned to regions of interest in the same pair, and the same cDNA are spotted in the regions of interest in each pair. Thus, for example, a region of interest can be expressed as "A, 1-a".

(6) Operations of Analyzing Apparatus

The operations of the analyzing apparatus 93 are explained below.

First, the analyzing unit 11 reads out a template T from the template storing unit 12, where the template T has regions of interest corresponding to the spot positions of the aforementioned array chip 1 or 1'. The analyzing unit 11 superimposes the template T on each of images represented by the label data S1 and the label data S2. In the following explanations, it is assumed that the array chips 1 and 1' correspond to the template of FIG. 4.

Next, the position of the template T is adjusted so that the positions of the regions of interest in the template T are aligned with the actual spot positions in the images. The alignment operation is necessary because the actual spot positions of the array chips are not necessarily exact spot positions which are predetermined. In practice, the positions of the regions of interest in the template T are aligned with the spot positions in the images by rotating, moving (in the vertical and horizontal directions), magnifying, and/or reducing the template T. The alignment operation may be performed automatically or manually. In the manual operation, the images of the label data S1 and the label data S2 may be displayed on the monitor 15, together with an image of the template T, and the alignment operation may be performed by manipulating the mouse.

In addition, it is preferable to remove abnormal data included in the label data S1 and the label data S2, before performing the above-mentioned alignment operation. Such abnormal data may be caused by a blur, effusion of the cDNAs from the spots, an abnormally great amount of luminosity, unevenly remaining fluorescent dye after the aforementioned washing, or the like.

As a result of the alignment operation, address numbers corresponding to the address numbers of the template T are assigned to the spot positions of the array chips 1 and 1'. In addition, since the position of each pixel can be represented by coordinates in the images represented by the label data S1 and label data S2, it is possible to obtain, corresponding to the addresses of the regions of interest, coordinates of the center positions of the regions of interest. Thus, information indicating correspondences between the addresses of the regions of interest and the coordinates of the center positions of the regions of interest can be obtained, in addition to the label data S1 and the label data S2.

After the above operations, densities of the respective spot positions are measured in accordance with an instruction from the input unit 16. To be more specific, values of the label data S1 in each region of interest are accumulated to obtain the accumulated value as the density of the region of interest. In this case, it is preferable to subtract from the accumulated value a background density value, where a density value of the support 2 per se of each array chip 1 or 1' is obtained as the background density value. After the density values of all of the regions of interest are obtained, a ratio between the density values of corresponding spot positions in the label data S1 and S2 is obtained for the respective regions of interest. That is, when N1 is a density value of a specific spot position in the label data S1, and N2 is a density value of the corresponding specific spot position in the label data S2, the ratio between the density values of the corresponding specific spot positions in the label data S1 and S2 is N2/N1.

Then, a measurement result table H is produced. In the measurement result table H, the ratios of the density values are listed in decreasing order, respectively associated with the corresponding addresses of the regions of interest (spot positions). The measurement result table H may contain, for example, the fifty greatest ratios, and is stored in the measurement result-storing unit 14. The label data S1 and the label data S2 are stored in the image storing unit 13, together with the above information indicating the correspondences between the addresses of the regions of interest and the coordinates of the center positions of the regions of interest.

Figure 7:
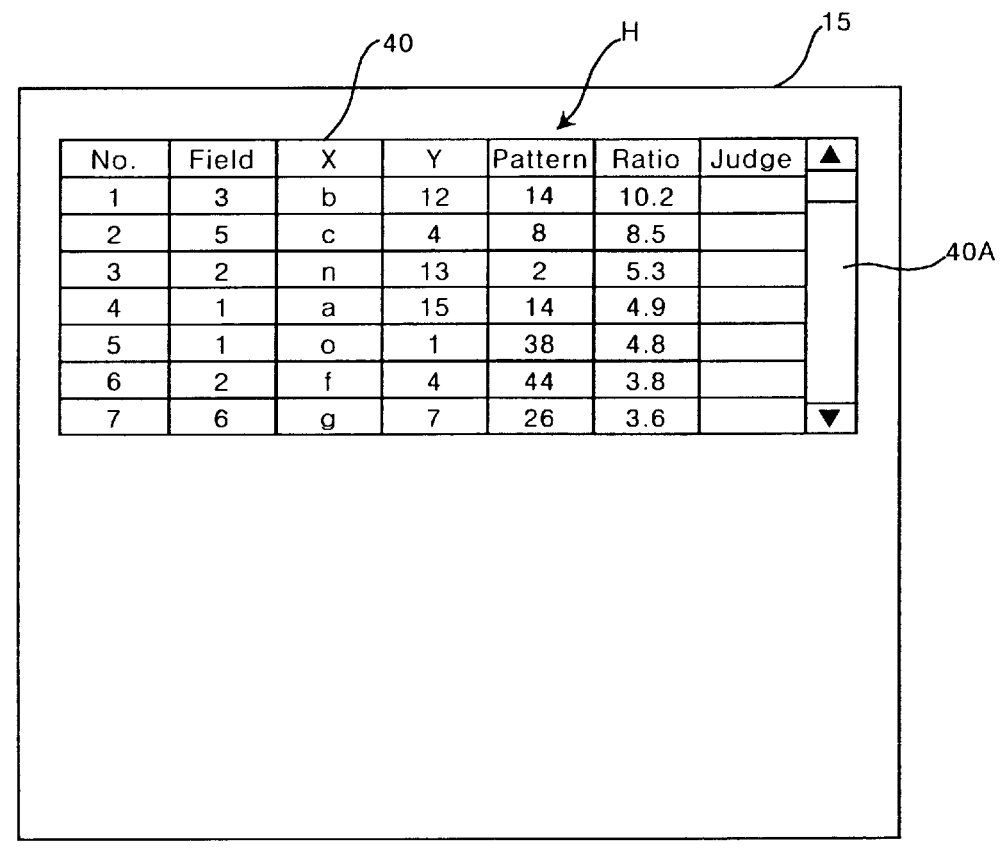

Next, when an instruction to display the measurement result table H is input by the input unit 16, the measurement result table H is read out from the measurement result storing unit 14, and displayed on the monitor 15. FIG. 7 shows an example of the display of the measurement result table H on the monitor 15. In the example of FIG. 7, information on regions of interest having the seven greatest ratios are displayed in the window 40, and information on other regions of interest can be displayed in the window 40 by scrolling the table. The information in the measurement result table H has columns for a list number (No.), the field number (Fieldn), the address numbers in the x and y directions (X, Y), the pattern number (No.), the ratio (Ratio), and a judgment (Judge). In the column for the judgment, an operator can write the operator's evaluation.

When the measurement result table H is displayed on the monitor 15, the operator can select a desired one of the list numbers. The selection may be made, for example, by clicking the desired list number (No.) in the displayed measurement result table H, whereby the image of the selected list is reversed. In response to the selection, the input unit 16 cuts, from the label data S1 and S2, local image data S4 and S5 of local images each having a predetermined area which includes in its center a spot block containing the spot position corresponding to the selected list number. The spot block containing the spot position is determined corresponding to an ROI block containing a region of interest corresponding to the spot position.

In the above operation of cutting the local images S4 and S5, the aforementioned information on the correspondences between the addresses of the regions of interest and the coordinates of the center positions of the regions of interest can be utilized. That is, coordinates of the spot positions are obtained based on the address numbers corresponding to the selected list number and the above information on the correspondences, and coordinates of the spot block containing the spot position corresponding to the selected list number are also determined. Then, pixels of the above-mentioned local images having the predetermined area including in its center the above spot block are cut from the label data S1 and S2 to obtain the image data S4 and S5, respectively. The obtained local image data S4 and S5 are read out from the image storing unit 13, and supplied to the monitor 15 for display.

Figure 8:
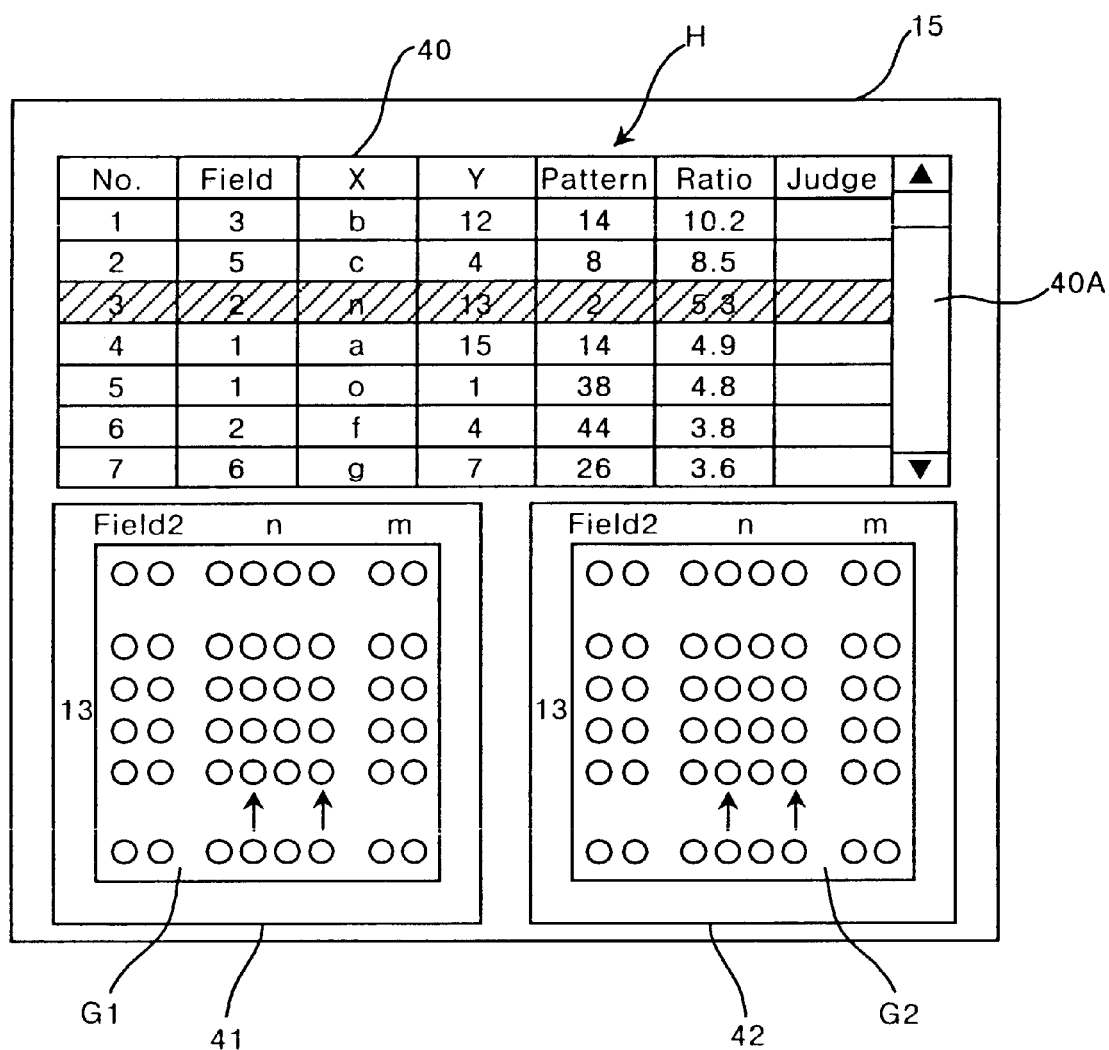
FIG. 8 shows an example of a measurement result table H and images which are displayed on the monitor 15 when the number of the samples is two.

Thus, the above local images each having the predetermined area including in its center the above spot block, i.e., images of the spot blocks each containing the spot position corresponding to the selected list number and areas around the spot blocks, are displayed on the monitor 15. Examples of these images are illustrated in FIG. 8 with references G1 and G2. That is, these local images G1 and G2 are contained in the windows 41 and 42, respectively. In the example of FIG. 8, the list number (No.) "3" is selected, and local images each including the spot block corresponding to the ROI block having the address "Field2, n-13" are displayed in the windows 41 and 42, respectively. In this case, it is preferable to indicate the address numbers of the spot blocks outside the local images G1 and G2, as illustrated in FIG. 8. In addition, since the selected list number, No. 3, corresponds to the pattern number "2", arrows for indicating the spot positions corresponding to the selected list number, No. 3, are displayed based on the pattern number "2", as illustrated in FIG. 8. Instead of the use of arrows, the spot positions corresponding to the selected list number, No. 3, may be indicated by image reversal, color change, flashing, or the like.

Based on the above displayed information, the operator can evaluate the measurement result, and write the evaluation in the column of "Judgment". For example, the evaluation may be indicated by "Good", "NG", or "?", where "Good" indicates that relevant gene is expressed, "NG" indicates that relevant gene is not expressed, and "?" indicates that the operator cannot determine whether the measurement result should be evaluated to be "Good" or "NG". For example, the evaluation "Good" may be input by pressing the "g" key, and the evaluation "NG" may be input by pressing the "n" key. The evaluation written in the "Judgment" column in the measurement result table H may be fixed by pressing the return key.

When the evaluation is fixed by pressing the return key, the selection of the list number automatically moves to the next list number, i.e., the selection moves from No. 3 to No. 4 in the example of FIG. 8. In response to the change of the selection, images of spot blocks containing spot positions corresponding to the newly selected list number (No. 4) and areas around the spot blocks, are displayed in the windows 41 and 42, in a similar manner to the case for the list number, No. 3. Thereafter, similar operations are repeated until an evaluation of a measurement result corresponding to the last list number is written in the measurement result table H.

In the above operations, the operation of writing the evaluations in the measurement result table H may be dispensed with. In this case, it is possible to configure the analyzing apparatus 93 so that the selection of the list number moves to the next list number by simply pressing the return key, and local images including spot blocks containing spot positions corresponding to the newly selected list number are displayed in the windows 41 and 42.

(7) Advantages

As described above, in this embodiment of the present invention, when a desired list number is selected in the measurement result table, local images including spot positions corresponding to the selected list number are automatically displayed. Therefore, even if the number of spot positions is great, the operator can easily confirm images including arbitrary spot positions for which measurement results are listed in the measurement result table H. That is, the operation for confirming the measurement result and the images corresponding to the measurement result can be performed efficiently.

In addition, since the spot positions corresponding to the selected measurement result are indicated by marks such as arrows in the displayed images, as illustrated in FIG. 8, the operator can easily confirm the spot positions in the images.

(8) Variations (i) Although, in the above embodiment, the aforementioned specific binding materials are cDNAs, and the aforementioned material of biological origin is a cDNA derived from cells, the specific binding materials and the material of biological origin in the present invention are not limited to those materials.

(ii) In the above embodiment, differences between the label data S1 and the label data S2 may be obtained, instead of the ratios. When the differences are obtained, the differences, instead of the ratios, are listed in the measurement result table H in descending order.

(iii) Although, in the above embodiment, one array chip is provided for each of the two samples A and B, the arrays of the cDNAs for the two samples A and B may be arranged on a single array chip.

Figure 9:
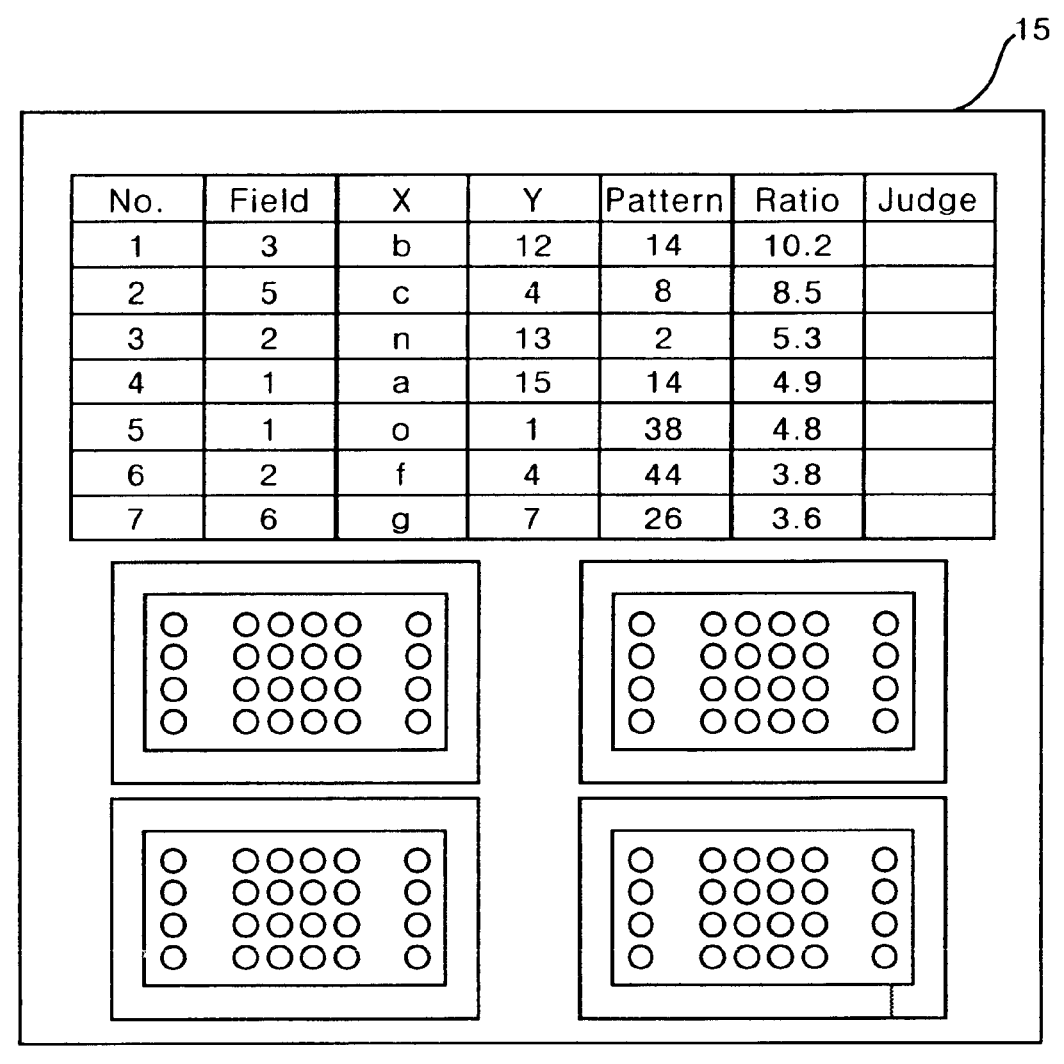

(iv) Although, in the above embodiment, the analysis is made for two samples, similar analysis can be made for more than two samples. FIG. 9 shows an example of a measurement result table and images which are displayed on the monitor 15 when the number of the samples is four.

(v) Although, in the above embodiment, a fluorescent dye is used as a labeling material, a radioactive isotope may be used, instead of the fluorescent dye.

(vi) In the above embodiment, a measurement result table is produced based on two sets of label data obtained from two array chips, respectively, and the measurement result table and local images including spot positions which are selected in the measurement result table are displayed by the monitor. However, the present invention is not limited to such a case, and is applicable to general cases where the monitor displays two images each including a plurality of measurement spots, and a measurement result table containing a plurality of lists respectively indicating a plurality of measurement results, and the plurality of measurement spots in one of the two images correspond to the plurality of measurement spots in the other of the two images, respectively.

In addition, all of the contents of the Japanese patent application, No.11-89355 are incorporated into this specification by reference.

(9) Further Variations

In the above-described embodiment, the images based on the label data S1 and S2 are displayed on the monitor 15. However, it should be noted that pseudo color images may be displayed in which the densities at the measurement spots are changed stepwise or the density ratio of one image to another is changed stepwise according to the measurement results.

Furthermore, in the above-described embodiment the monitor 15 displays the measurement result table H at first and then displays images G1 and G2 by clicking the mouse at the desired list in the measurement result table H. However, it is possible to carry out the displaying method as described hereinbelow. It will now be described as another embodiment of the invention. In the following embodiment, the processes up to the measurement of density at the respective spot positions and the preparation of the measurement result table H are the same as those described hereinabove in connection with the above-described embodiment, and accordingly will not be described repeatedly in detail.

In the another embodiment, in response to an instruction to display an image by an input means 16, an image read out means 17 cuts out image data S4 and S5 from the label data S1 and S2 stored in an image storing means 13. The image data S4 and S5 indicate the image in a specific region including the predetermined spot block in its center. The spot block corresponds to a ROI block at the position of "Field 2, p-1" when the template is the one as shown in FIG. 4.

Figure 10:
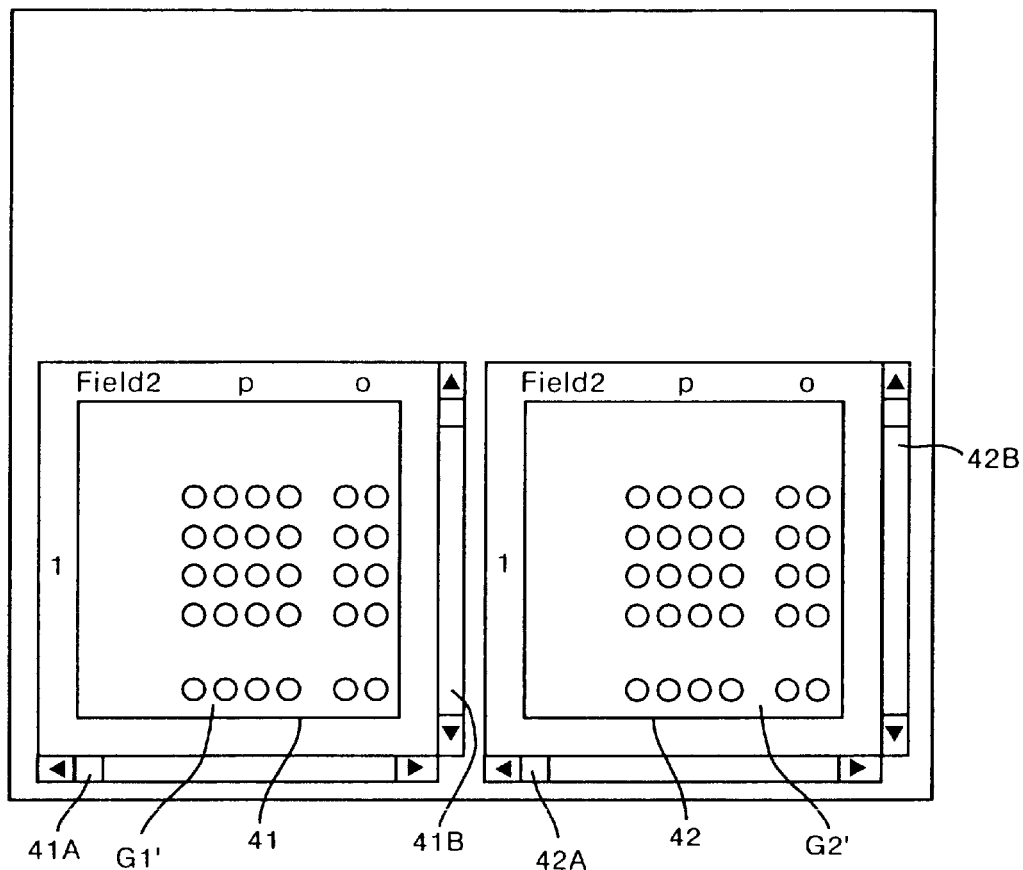
FIG. 10 shows an example of another embodiment of the invention.

The obtained image data S4 and S5 are read out from the image storing means 13 and displayed on the monitor 15, whereby the images of the spot block corresponding to the ROI block having the address of "Field 2, p-1" are displayed in the windows 41 and 42 of the display 15, respectively, along with their surrounding images as images G1' and G2' as shown in FIG. 10. In the windows 41 and 42, scroll keys 41A, 41B, 42A and 42B are displayed, and the images G1' and G2' can be scrolled by use of these keys of one of the windows 41 and 42. In this case, scrolling one image causes scrolling of the other image in a synchronized fashion.

Figure 11:
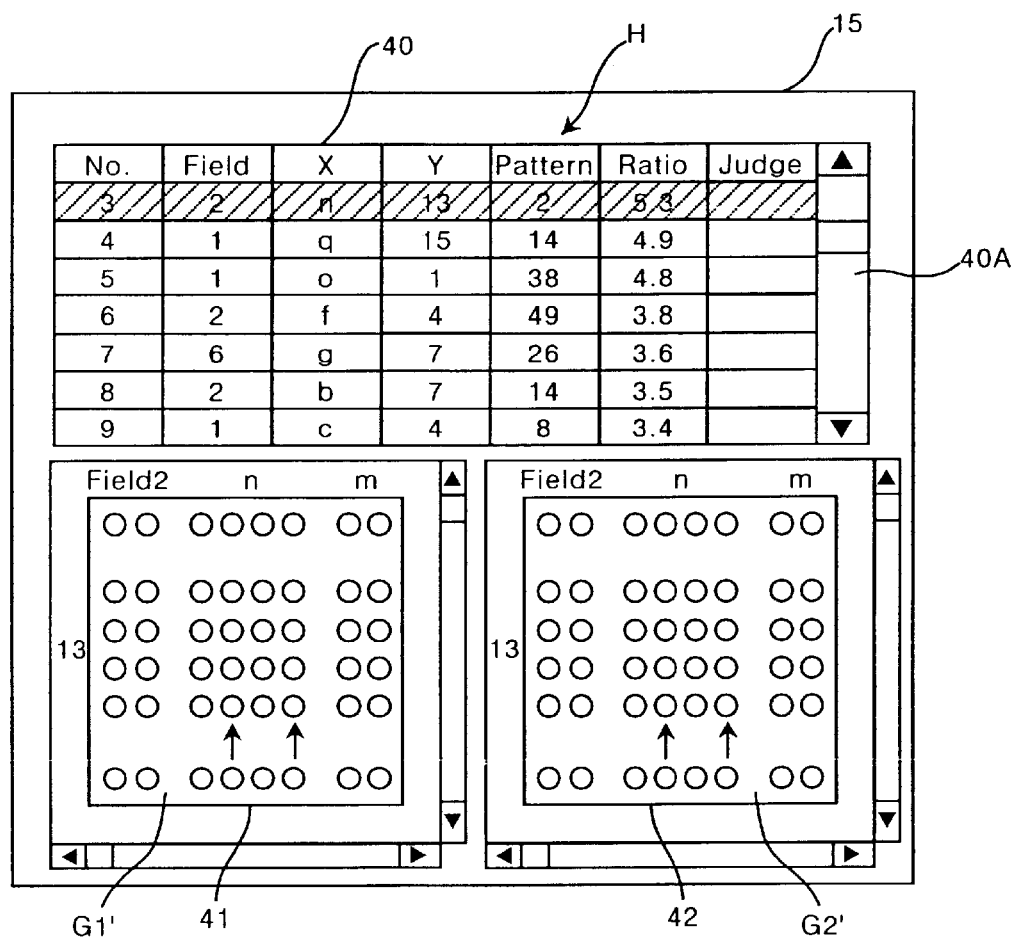
FIG. 11 shows another example of a measurement result table and images which are displayed on the monitor 15.

When the images G1' and G2' are displayed in the windows 41 and 42 on the monitor 15, the operator scrolls the images G1' and G2' to search for the position of the desired spot. Then, when the position of the desired spot is found out, the position is selected by a click of a mouse. In response to the selection of the position of the desired spot, the measurement result table H is read out from the measurement result storing means 14 and displayed on the monitor 15 as shown in FIG. 11. Then, the list which shows the measurement result at the position of the selected spot is displayed at the top line of the measurement result table H in a reversed state. Further, at the position of the spot, arrows are displayed to show the position of the spots and their corresponding spots. Instead of the use of arrows, the spot positions may be indicated by image reversal, color change, flashing, or the like. As to the list also, the indication by image reversal may be replaced by arrows, color change or flashing in the spot positions.

The operator observes the images G1 and G2 as well as the measurement result table H thus displayed on the monitor 15, and inputs the evaluation thereof in the column of Judge of the measurement result table H as in the above-described embodiment. Then, upon fixing the input evaluation by depressing the return key, the images G1' and G2' in the windows 41 and 42 become scrollable. Hence, it becomes possible to search the position of the desired spot again.

Hence, in the another embodiment of the present invention, by selecting the position of the desired spot in the images G1' and G2' in the windows 41 and 42, the list of the measurement result table H corresponding to the position of the spot is displayed. Therefore, even if the number of spot positions is great, the operator can easily confirm images including arbitrary spot positions for which measurement results are listed in the measurement result table H. That is, the operation for confirming the measurement result and the images corresponding to the measurement result can be performed efficiently.

What is claimed is:

1. An image display method comprising the steps of:
 (a) displaying a measurement result table including a plurality of lists respectively containing a plurality of measurement results each of which is obtained from at least two corresponding measurement spots in at least two images, where said at least two corresponding measurement spots belong to said at least two images, respectively, so that the at least two images each include a plurality of measurement spots which respectively correspond to a plurality of measurement spots in every other one of the at least two images;
 (b) receiving an instruction to select one of the plurality of lists in said measurement result table; and
 (c) selectively displaying a portion of each of the at least two images so that the portion contains one of the plurality of measurement spots which corresponds to said selected one of the plurality of lists.

2. An image display method according to claim 1, wherein, each step (c), a mark indicating said one of the plurality of measurement spots is displayed in said portion.

3. An image display method according to claim 1, wherein, in step (c) a mark indicating said selected one of the plurality of lists is displayed in said portion.

4. An image display method according to claim 1, further comprising the steps of receiving an input of an evaluation of one of said plurality of measurement results correspond to said one of the plurality of lists, and displaying the evaluation in the measurement result table.

5. An image display method according to claim 4, further comprising the steps of automatically selecting another of the plurality of lists in said measurement result table in response to said input of the evaluation or a predetermined operation after said input of the evaluation, and displaying another portion of each of the at least two images so that said another portion contains one of the plurality of measurement spots which corresponds to said another of the plurality of lists.

6. An image display method according to claim 5, wherein said another of the plurality of lists is next to said one of the plurality of lists selected in accordance with the instruction received in step (b).

7. An image display method according to claim 4, displaying only the list in which the desired evaluation is input, after the input of said evaluation.

8. An image display method according to claim 7, further displaying a mark which indicates the measurement spot where the measurement result corresponding to the displayed list is obtained.

9. An image display method according to claim 1, wherein each of said at least two images is represented by a label signal emitted from a labeling material with which a material of biological origin is labeled, where the material of biological origin is bound with a purality of different, known, specific binding materials arranged at a plurality of predetermined positions on one of a plurality of supports, and said material of biological origin labeled with the labeling material which emits the label signal representing each of said at least two images is different from a material of biological origin labeled with the labeling material which emits another label signal representing every other one of said at least two images, and said measurement result is a result of comparison of said label signal representing said each of said at least two images, with said another label signal representing every other one of said at least two images.

10. An image display method comprising the steps of:
(a) displaying a measurement result table including a plurality of lists respectively containing a plurality of measurement results each of which is obtained from at least two corresponding measurement spots in at least two images, where said at least two corresponding measurement spots belong to said at least two images, respectively, so that the at least two images each include a plurality of measurement spots which respectively correspond to a plurality of measurement spots in every other one of the at least two images;
(b) receiving an instruction to select one of the plurality of measurement spots where the desired measurement result is obtained in one of the at least two images; and
(c) selectively displaying a list showing the measurement result corresponding to the selected measurement spot in the measurement result table.

11. An image display method according to claim 10, wherein, in step (c), a mark indicating said selected one of the plurality of measurement spots is displayed.

12. An image display method according to claim 10, wherein, in step (c), a mark indicating said selected one of the plurality of lists showing said corresponding measurement result is displayed.

13. An image display method according to claim 10, wherein the evaluation of said selected measurement spot is enabled to be inputted into said list.

14. An image display method according to claim 10, wherein each of said at least two images is represented by a label signal emitted from a labeling material with which a material of biological origin is labeled, where the material of biological origin is bound with a plurality of different, known, specific binding materials arranged at a plurality of predetermined positions on one of a plurality of supports, and said material of biological origin labeled with the labeling material which emits the label signal representing each of said at least two images is different from a material of biological origin labeled with the labeling material which emits another label signal representing every other one of said at least two images, and said measurement result is a result of comparison of said label signal representing said each of said at least two images, with said another label signal representing every other one of said at least two images.

15. An image display apparatus comprising:

a display unit which displays information;

a table displaying control unit which controls said display unit so as to display a measurement result table including a plurality of lists each of which is obtained from at least two corresponding measurement spots in at least two images, where said at least two corresponding measurement spots belong to said at least two images, respectively, so that the at least two images each include a plurality of measurement spots which respectively correspond to a plurality of measurement spots in every other one of the at least two images;

an instruction receiving unit which receives an instruction to select one of the plurality of lists in said measurement result table; and an image display control unit which controls said display unit so as to selectively display a portion of each of the at least two images so that the portion contains one of the plurality of measurement spots which corresponds to said one of the plurality of lists.

16. An image display apparatus according to claim 15, wherein said image display control unit controls said display unit so as to further display a mark indicating said one of the plurality of measurement spots in said portion.

17. An image display apparatus according to claim 15, wherein said image display control unit controls said display unit so as to further display a mark indicating said selected list.

18. An image display method according to claim 15, further comprising an evaluation inputting unit which inputs an evaluation of said corresponding measurement spot into said list.

19. An image display apparatus according to claim 18, further comprising an automatic selection unit which automatically selects another of the plurality of lists in said measurement result table in response to said input of the evaluation or a predetermined operation after said input of the evaluation, and controls the display unit so as to selectively display another portion of each of the at least two images so that said another portion contains one of the plurality of measurement spots which corresponds to said another of the plurality of lists.

20. An image display apparatus according to claim 19, wherein said another of the plurality of lists is next to said one of the plurality of lists selected.

21. An image display apparatus according to claim 18, wherein said image display control unit displays only the list in which the desired evaluation is input, after the input of said evaluation, on said display unit.

22. An image display apparatus according to claim 21, wherein another of the plurality of lists is next to said one of the plurality of lists.

23. An image display apparatus according to claim 15, wherein each of said at least two images is represented by a label signal emitted from a labeling material with which a material of biological origin is labeled, where the material of biological origin is bound with a plurality of different, known, specific binding materials arranged at a plurality of predetermined positions on one of a plurality of supports, and said material of biological origin labeled with the labeling material which emits the label signal representing each of said at least two images is different from a material of biological origin labeled with the labeling material which emits another label signal representing every other of said at least two images, and said measurement result is a result of comparison of said label signal representing said each of said at least two images, with said another label signal representing every other of said at least two images.

24. An image display apparatus comprising:

a display unit which display information;

a table displaying control unit which controls said display unit so as to display a measurement result table including a plurality of lists each of which is obtained from at least two corresponding measurement spots in at least two images, where said at least two corresponding measurement spots belong to said at least two images, respectively, so that the at least two images each include a plurality of measurement spots which respectively correspond to a plurality of measurement spots in every other one of the at least two images;

an instruction receiving unit which receives an instruction to select one of the plurality of measurement spots where the desired measurement result is obtained in one of said at least two images; and an image display control unit which controls said display unit so as to selectively display the list which indicates the measurement result corresponding to said selected one of the plurality of measurement spots in said measurement result table.

25. An image display apparatus according to claim 24, wherein said image display control unit controls said display unit so as to further display a mark indicating said corresponding measurement spot.

26. An image display apparatus according to claim 24, wherein said image display control unit controls said display unit so as to further display a mark indicating the list which shows said corresponding measurement result.

27. An image display method according to claim 24, further comprising an evaluation inputting unit which inputs an evaluation of said corresponding measurement spot into said list.

28. An image display apparatus according to claim 24, wherein each of said at least two images is represented by a label signal emitted from a labeling material with which a material of biological origin is labeled, where the material of biological origin is bound with a plurality of different, known, specific binding materials arranged at a plurality of predetermined positions On one of a plurality of supports, and said material of biological origin labeled with the labeling material which emits the label signal representing each of said at least two images is different from a material of biological origin labeled with the labeling material which emits another label signal representing every other of said at least two images, and said measurement result is a result of comparison of said label signal representing said each of said at least two images, with said another label signal representing every other of said at least two images.

* * * * *